(12) United States Patent
Simpson et al.

(10) Patent No.: US 12,093,938 B2
(45) Date of Patent: Sep. 17, 2024

(54) TRANSACTION SYSTEM AND METHOD OF OPERATION THEREOF

(71) Applicant: UVUE LTD, Bury St Edmunds (GB)

(72) Inventors: Toby William Simpson, Cambridge (GB); Troels Rønnow, Cambridge (GB); Jonathan Ward, Cambridge (GB)

( * ) Notice: Subject to any disclaimer, the term of this patent is extended or adjusted under 35 U.S.C. 154(b) by 0 days.

(21) Appl. No.: 17/269,007

(22) PCT Filed: Aug. 16, 2019

(86) PCT No.: PCT/IB2019/056952
§ 371 (c)(1),
(2) Date: Feb. 17, 2021

(87) PCT Pub. No.: WO2020/035831
PCT Pub. Date: Feb. 20, 2020

(65) Prior Publication Data
US 2021/0350363 A1    Nov. 11, 2021

(30) Foreign Application Priority Data

Aug. 17, 2018 (GB) ...................................... 1813459

(51) Int. Cl.
*G06Q 20/38* (2012.01)
*G06Q 20/06* (2012.01)
(52) U.S. Cl.
CPC ....... *G06Q 20/3827* (2013.01); *G06Q 20/065* (2013.01); *G06Q 20/38215* (2013.01); *G06Q 20/3825* (2013.01)
(58) Field of Classification Search
CPC ............. G06Q 20/3827; G06Q 20/065; G06Q 20/38215; G06Q 20/3825
(Continued)

(56) References Cited

U.S. PATENT DOCUMENTS 5,970,496 A * 10/1999 Katzenberger ...... G06F 16/9024
707/999.102
6,236,410 B1 * 5/2001 Politis ................. G06F 9/45508
345/440
(Continued)

FOREIGN PATENT DOCUMENTS

WO    2017112664 A1    6/2017

OTHER PUBLICATIONS

Notification of Transmittal of the International Search Report and Written Opinion of the International Searching Authority mailed in PCT Application No. PCT/IB2019/056952 on Dec. 18, 2019, 13 pages.
(Continued)

*Primary Examiner* — Bennett M Sigmond
*Assistant Examiner* — Michael J Warden
(74) *Attorney, Agent, or Firm* — RC Trademark Company (57) ABSTRACT

There is provided a transaction system that includes a plurality of computing nodes that are mutually interconnected via a data communication network to exchange encrypted data therebetween. The transaction system employs a blockchain whose entries are recorded in a ledger. A directed acyclic graph (DAG) is utilized for defining relationships between blocks of the blockchain. The DAG comprises a plurality of proposed solutions to problems posed in the one or more smart contracts. Each of the one or more smart contracts includes machine-readable elements including at least one of: a data specification, an initial mining algorithm, an objective function for scoring the plurality of proposed solutions. The transaction system operates to cause the DAG to store temporary data and/or extended algorithm code used during an execution of a given transaction, wherein the temporary data and/or extended algorithm code stored in the DAG is to be removed once the
(Continued)

execution of the given transaction is complete, further wherein the temporary data and/or extended algorithm code stored in the DAG is to be modified in response to new solutions arising during operation of the transaction system. The transaction system operates to accommodate a given smart contract defining a problem that is to be solved, giving a plurality of parties of the transaction system an opportunity to receive consideration when the problem is solved, and wherein the consideration is a quantity representing at least one of: an access to data storage, an access to data memory, an access to data communication system bandwidth, access to data communication channels or ports, data processor energy use, data processor energy dissipation, an access time taken by data processing resources during transactions, heat generation in computing hardware, cooling energy applied to computing hardware or any other measure associated with one or more CPU cycles.

16 Claims, 4 Drawing Sheets

(58) Field of Classification Search
USPC .......................................................... 705/44
See application file for complete search history.

(56) References Cited

U.S. PATENT DOCUMENTS

| | | | | |
|---|---|---|---|---|
| 10,152,349 | B1* | 12/2018 | Anand | G06N 20/00 |
| 10,871,950 | B2* | 12/2020 | De Smet | G06F 16/9024 |
| 11,010,728 | B2* | 5/2021 | Irazabal | G06Q 20/367 |
| 11,281,988 | B1* | 3/2022 | Naveh | G06N 10/00 |
| 11,349,824 | B2* | 5/2022 | Li | H04L 9/0637 |
| 2003/0204562 | A1* | 10/2003 | Hwang | H04L 9/40 709/226 |
| 2004/0216095 | A1* | 10/2004 | Wu | G06F 8/445 717/151 |
| 2006/0005176 | A1* | 1/2006 | Kawahara | G06F 8/456 717/149 |
| 2009/0055332 | A1* | 2/2009 | Lee | G06N 5/025 706/47 |
| 2012/0019535 | A1* | 1/2012 | Miyashita | G06T 11/206 345/440 |
| 2012/0079490 | A1* | 3/2012 | Bond | G06F 9/5038 718/103 |
| 2016/0072697 | A1* | 3/2016 | Thubert | H04L 45/48 370/254 |
| 2016/0197829 | A1* | 7/2016 | Thubert | H04L 45/02 370/392 |
| 2017/0353309 | A1* | 12/2017 | Gray | G06F 21/51 |
| 2018/0308134 | A1* | 10/2018 | Manning | G06Q 30/02 |
| 2019/0042911 | A1* | 2/2019 | Koren | G06N 3/04 |
| 2019/0179648 | A1* | 6/2019 | Kevorkian | G06F 16/2428 |
| 2020/0004604 | A1* | 1/2020 | Lavoie | G06F 16/907 |
| 2020/0004737 | A1* | 1/2020 | Qiu | G06F 16/245 |
| 2020/0076884 | A1* | 3/2020 | Li | H04L 9/0637 |
| 2021/0350363 | A1* | 11/2021 | Simpson | G06Q 20/3825 |
| 2021/0365357 | A1* | 11/2021 | Gamliel | G06F 11/3692 |
| 2022/0101318 | A1* | 3/2022 | Zhang | G06N 5/022 |
| 2022/0136722 | A1* | 5/2022 | Sharma | G05B 15/02 700/300 |
| 2022/0164338 | A1* | 5/2022 | Blackshear | H04L 9/32 |
| 2022/0168172 | A1* | 6/2022 | Raheman | A61H 9/0092 |
| 2022/0172221 | A1* | 6/2022 | Bhattiprolu | H04L 9/50 |

OTHER PUBLICATIONS

Notification Concerning Transmittal of the International Preliminary Report on Patentability mailed in PCT Application No. PCT/IB2019/056952 on Mar. 4, 2021, 08 pages.

* cited by examiner

TRANSACTION SYSTEM AND METHOD OF OPERATION THEREOF

TECHNICAL FIELD

The present disclosure relates generally to transaction systems; for example, the present disclosure relates to a transaction system that includes computing nodes that are mutually interconnected via a data communication network, wherein the computing nodes transact an organized exchange of data therebetween, for example data representative of consideration or resources therebetween, in an encrypted manner, wherein the data pertains to execution of computing tasks within the transaction system, wherein the organized exchange includes a use of a blockchain arrangement controlled by a use of a ledger arrangement, wherein the data can include technical elements such as one or more of: an access to data storage, an access to data memory, an access to data communication system bandwidth, access to data communication channels or ports, data processor energy use, data processor energy dissipation, an access time taken by data processing resources during transactions, heat generation in computing hardware, cooling energy applied to computing hardware or any other measure associated with one or more CPU cycles, but not limited thereto. Moreover, the present disclosure relates to methods of (namely, to methods for) operating the aforementioned transaction systems. Furthermore, the present disclosure also relates to computer program products comprising non-transitory computer-readable storage media having computer-readable instructions stored thereon, the computer-readable instructions being executable by a computerized device comprising processing hardware to execute aforementioned methods.

BACKGROUND

When in operation, contemporary transaction systems exchange data therein, for example in an encrypted manner, to render the transaction systems more robust against malware, to resist third party attacks, and to protect against similar hostile interventions. Moreover, the transaction systems are required to function in a robust and reliable manner, wherein exchanges of data within the transaction system can concern, for example, configurational data that controls functioning of the nodes of the transaction systems. Such configurational data directly affects an operating stability of the transaction systems.

Data communicated in an encrypted form within aforesaid transaction systems can represent, for example in a tokenized manner, consideration or resources that is expressed by one or more values or quantities. The consideration or resources can be awarded in response to doing work in respect of the transaction system. However, within the transaction system, to ensure its orderly functioning, verification of work having been done and verification of consideration or resources being exchanged within the transaction system is important, for ensuring that the transaction system functions reliably and does not become chaotic and its manner of operation.

Various types of software-based and hardware-based firewalls have been developed to protect against third-party hostile attacks in computer networks. Moreover, work done by participating nodes of a distributed environment implemented via use of a transaction system needs to be validated, and the participating nodes are required to be incentivized to do work in a verifiable manner.

Therefore, in light of the foregoing technical problems of known art, there exists a need to provide an improved transaction system, and also an improved method of (namely, improved method for) operating the improved transaction system for addressing overcome aforementioned drawbacks.

SUMMARY

The present disclosure seeks to provide a transaction system that includes a plurality of computing nodes that are mutually interconnected via a data communication network, wherein, when in operation, the transaction system employs a blockchain that is recorded in a ledger, wherein a directed acyclic graph (DAG) is utilized for defining relationships between blocks of the blockchain; the present disclosure seeks to improve how a decentralized computer network functions in terms of reliability and robustness (decreases "downtime"), speed, security (wherein encryption and decryption is relevant in each step of a transaction) when implementing one or more transactions via use of a distributed, secured, reliable data communication network.

The present disclosure also seeks to provide a method of (namely, a method for) operating a transaction system that includes a plurality of computing nodes that are mutually interconnected via a data communication network, wherein, when in operation, the transaction system employs a blockchain that is recorded in a ledger, wherein a directed acyclic graph (DAG) is utilized for defining relationships between blocks of the blockchain; the present disclosure seeks to improve methods of functioning of a decentralized computer network in terms of reliability and robustness (decreases "downtime"), speed, security (wherein encryption and decryption is relevant in each step of a transaction) when implementing one or more transactions via use of a distributed, secured, reliable data communication network.

In one aspect, the present disclosure provides a transaction system that includes a plurality of computing nodes that are mutually interconnected via a data communication network to exchange encrypted data therebetween, wherein, when in operation, the transaction system employs a blockchain whose entries are recorded in a ledger, wherein a directed acyclic graph (DAG) is utilized for defining relationships between blocks of the blockchain, characterized in that:

(a) the ledger is implemented as a distributed ledger that stores references to a start and an end of the DAG, as well as references to one or more smart contracts employed in operation of the transaction system, wherein the one or more smart contracts define consideration that is to be exchanged in response to providing proof of completion of work;

(b) the DAG comprises a plurality of proposed solutions to problems posed in the one or more smart contracts;

(c) each of the one or more smart contracts includes machine-readable elements including at least one of: a data specification, an initial mining algorithm, an objective function for scoring the plurality of proposed solutions; and (d) the transaction system operates to cause the DAG to store temporary data and/or extended algorithm code used during an execution of a given transaction, wherein the temporary data and/or extended algorithm code stored in the DAG is removed once the execution of the given transaction is complete, further wherein the temporary data and/or extended algorithm code stored in the DAG is modified in response to new solutions arising during operation of the transaction system.

The present disclosure is of advantage that there is provided an at least partial solution to providing more robust operation of transaction systems, for example from malicious third-party attacks. Moreover, the present disclosure is of advantage in that it provides a more efficient, effective and robust approach using a transaction system for carrying out transactions within a distributed economy.

In another aspect, the present disclosure provides a method of (for) operating a transaction system that includes a plurality of computing nodes that are mutually interconnected via a data communication network to exchange encrypted data therebetween, wherein, when in operation, the transaction system employs a blockchain whose entries are recorded in a ledger, wherein a directed acyclic graph (DAG) is utilized for defining relationships between blocks of the blockchain, characterized in that the method includes:

(a) implementing the ledger as a distributed ledger that stores references to a start and an end of the DAG, as well as references to one or more smart contracts employed in operation of the transaction system, wherein the one or more smart contracts define consideration that is to be exchanged in response to providing proof of completion of work;

(b) arranging for the DAG to comprise a plurality of proposed solutions to problems posed in the one or more smart contracts;

(c) arranging for each of the one or more smart contracts to include machine-readable elements including at least one of: a data specification, an initial mining algorithm, an objective function for scoring the plurality of proposed solutions; and (d) operating the transaction system to cause the DAG to store temporary data and/or extended algorithm code used during an execution of a given transaction, wherein the temporary data and/or extended algorithm code stored in the DAG is removed once the execution of the given transaction is complete, further wherein the temporary data and/or extended algorithm code stored in the DAG is modified in response to new solutions arising during operation of the transaction system.

In yet another aspect, an embodiment of the present disclosure provides a computer program product comprising non-transitory computer-readable storage media having computer-readable instructions stored thereon, the computer-readable instructions being executable by a computerized device comprising processing hardware to execute the aforesaid method.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a transaction system that includes a plurality of computing nodes that are mutually interconnected via a data communication network to exchange encrypted data therebetween, wherein, when in operation, the transaction system employs a blockchain whose entries are recorded in a ledger, wherein a directed acyclic graph (DAG) is utilized for defining relationships between blocks of the blockchain, wherein:

(a) the ledger is implemented as a distributed ledger that stores references to a start and an end of the DAG, as well as references to one or more smart contracts employed in operation of the transaction system, wherein the one or more smart contracts define consideration that is to be exchanged in response to providing proof of completion of work;

(b) the DAG comprises a plurality of proposed solutions to problems posed in the one or more smart contracts;

(c) each of the one or more smart contracts includes machine-readable elements including at least one of: a data specification, an initial mining algorithm, an objective function for scoring the plurality of proposed solutions; and (d) the transaction system operates to cause the DAG to store temporary data and/or extended algorithm code used during an execution of a given transaction, wherein the temporary data a and/or extended algorithm code stored in the DAG is removed once the execution of the given transaction is complete, further wherein the temporary data and/or extended algorithm code stored in the DAG is modified in response to new solutions arising during operation of the transaction system.

In another aspect, an embodiment of the present disclosure provides a method of (namely, a method for) operating a transaction system that includes a plurality of computing nodes that are mutually interconnected via a data communication network to exchange encrypted data therebetween, wherein, when in operation, the transaction system employs a blockchain whose entries are recorded in a ledger, wherein a directed acyclic graph (DAG) is utilized for defining relationships between blocks of the blockchain, wherein the method includes:

(a) implementing the ledger as a distributed ledger that stores references to a start and an end of the DAG, as well as references to one or more smart contracts employed in operation of the transaction system, wherein the one or more smart contracts define consideration that is to be exchanged in response to providing proof of completion of work;

(b) arranging for the DAG to comprise a plurality of proposed solutions to problems posed in the one or more smart contracts;

(c) arranging for each of the one or more smart contracts to include machine-readable elements including at least one of: a data specification, an initial mining algorithm, an objective function for scoring the plurality of proposed solutions; and (d) operating the transaction system to cause the DAG to store temporary data and/or extended algorithm code used during an execution of a given transaction, wherein the temporary data and/or extended algorithm code stored in the DAG is removed once the execution of the given transaction is complete, further wherein the temporary data and/or extended algorithm code stored in the DAG is modified in response to new solutions arising during operation of the transaction system.

In yet another aspect, an embodiment of the present disclosure provides a computer program product comprising non-transitory computer-readable storage media having computer-readable instructions stored thereon, the computer-readable instructions being executable by a computerized device comprising processing hardware to execute the aforesaid method.

The present disclosure seeks to provide a solution to a technical problem of operating nodes of a data communication network that, when in operation, distribute work associated with transactions; embodiments of the present disclosure are relevant, for example, to implement a distributed environment, for example a distributed economy, but not limited thereto. In addition, the present disclosure also seeks to provide a method of (namely, a method for) operating nodes of a data communication network in a manner that rewards incentives for proposing solutions for problems posed in the distributed work. Moreover, the proposed system and method allow for making changes within a smart contract associated with the transactions. Hence, the present disclosure provides a way to modify dynamically the smart contracts. Furthermore, the present disclosure allows for evaluation of the proposed solutions within the system. Moreover, the present disclosure allows for an efficient, effective and robust approach for carrying out transactions within the distributed economy. In addition, the system and method proposed herein can be implemented using conventional hardware devices whose technical operation is implemented pursuant to the present disclosure.

Throughout the present disclosure, the term "transaction(s)" refers to an exchange of consideration (for example, provided as services, information, materials, resources, products and so forth between two or more transacting parties (namely, participants or participating nodes of the transactions)). For example, a transacting party A may perform a transaction with another transacting party B, wherein the transacting party A may provide an incentive to the transacting party B in a form of consideration (for example, in a form of technical consideration pertaining to at least one of: an access to data storage, an access to data memory, an access to data communication system bandwidth, access to data communication channels or ports, data processor energy use, data processor energy dissipation, an access time taken by data processing resources during transactions, heat generation in computing hardware, cooling energy applied to computing hardware or any other measure associated with one or more CPU cycles) in return for a software program product being provided by the transacting party B. Notably, incentives (for example, remuneration, a technical consideration as aforementioned, and so forth) are provided by a first transacting party, such as a business entity, associated with a first computing node, to a second transacting party for services, information, products and the like provided by the second transacting party, such as a miner, associated with a second computing node. In addition, incentives are payments in a form of a value, a token, a fiat currency and the like provided by the first transacting party to the second transacting party in lieu of the aforesaid technical consideration (for example, services, information and/or products provided by the second transacting party).

In the present disclosure, the term "transacting parties" and "plurality of parties" are used interchangeably. The transacting parties are able to access the transaction system via one or more of its communication nodes, for example using software applications that encrypt and/or decrypt data flowing therethrough to improve robustness and security of the transaction to third-party malicious attacks. Thus, it will be appreciated that each of the two or more transacting parties are associated with at least one of the plurality of computing nodes included in the transaction system.

Throughout the present disclosure the term "transaction system" refers to a processing system for data associated with transactions between the two or more transacting parties; such transactions can include exchanges of data, for example data in encrypted and/or obfuscated form.

It will be appreciated that use of a combination of encryption and obfuscation provides extremely secure data when in encrypted form. Optionally, encryption and obfuscation functions employed are encoded into a data map that records a type of encryption employed and how data bits or bytes are swapped for obfuscation purposes, for example selective swapping of nibbles in certain bytes to provide obfuscation; the data map is used when encrypting and decrypting data. Optionally, the data map itself is encrypted to avoid third party hacking. When encrypting and obfuscating data within the transaction system to provide a very high degree of security, multiple stages of encryption and obfuscation are beneficially employed, for example in Equations 1 and 2 (Eq. 1 and Eq. 2 respectively):

$$\text{Data encrypted}=O2[E2[O1[E\ i(Dat3\text{unencrypted})]]] \quad \text{Eq. 1}$$

$$\text{Data unencrypted}=E\mathstrut^{1}O\mathstrut^{1}\ [E2^{1}[O2\mathstrut^{}\text{Data encrypted})]]] \quad \text{Eq. 2}$$

wherein

E i, E2 are encryption functions, $E^1$, $E2^1$ are corresponding decryption functions respectively, and Oi, O2 are obfuscation functions, $O^1$, $O2^1$ are corresponding de obfuscation functions respectively, and a data map records a selection of the aforementioned encryption functions Ei, $E_2$ and the obfuscation functions Oi, $O_2$.

Various types of encryption, for example entropy encoding or Huffman encoding, are known in the art that can be used for implementing Equations 1 and 2. Selective nibble swapping for bytes can be used for obfuscation purposes, for example.

The data map, for example in encrypted form can be distributed within the transaction systems. Optionally, the data map is periodically updated in case third parties are found to have been able to hack the data map. Optionally, a plurality of mutually different data maps is employed concurrently within the transaction system to provide an even greater degree of data robustness against hacking.

The transaction system allows the two or more transacting parties for collection, modification and retrieval of the data associated with the transactions. In addition, the data associated with the transactions can be details of transacting parties, date and time of transactions, a smart contract associated with the transactions and so forth.

As aforementioned, the transaction system includes the plurality of computing nodes that are mutually interconnected via the data communication network. Furthermore, the plurality of computing nodes are computational elements that are operable to respond to, and processes instructions that drive, the transaction system. Optionally, the plurality of computing nodes includes, but are not limited to, a microprocessor, a microcontroller, a complex instruction set computing (CISC) microprocessor, a reduced instruction set (RISC) microprocessor, a very long instruction word (VLIW) microprocessor, an artificial intelligence (AI) computing engine based on hierarchical networks of variable-state machines, or any other type of processing circuit. Furthermore, the computing nodes can be one or more individual processors, processing devices and various elements associated with a processing device that may be shared by other processing devices. Additionally, the plurality of computing nodes, processing devices and elements are arranged in various architectures for responding to and processing the instructions that drive the system.

Moreover, the plurality of computing nodes is communicably coupled to each other via the data communication network. The data communication network allows for communication among the plurality of computing nodes. In other words, each of the plurality of computing nodes is capable of communicating with other computing nodes via the data communication network in order to perform the transactions and maintain transaction records (such as transaction details, transaction history and so forth) associated therewith. Notably, the data communication network relates to an arrangement of interconnected, programmable and/or non-programmable components that, when in operation, facilitate data communication between one or more electronic devices and/or databases. Furthermore, the data communication network may include, but is not limited to, a peer-to-peer (P2P) network, a hybrid peer-to-peer network, local area networks (LANs), radio access networks (RANs), metropolitan area networks (MANS), wide area networks (WANs), all of or a portion of a public network such as global computer network known as the Internet®, a private network, a cellular network and any other communication system. Additionally, the data communication network employs wired or wireless communication that can be carried out via one or more known protocols, including, but not limited to, Internet Protocol (IP), Wireless Access Protocol (WAP), Frame Relay, or Asynchronous Transfer Mode (ATM). Moreover, any other suitable protocols using voice, video, data, or combinations thereof, can also be employed, for example VoIP.

In an example embodiment, the data communication network is implemented as a distributed peer-to-peer (P2P) network of interconnected plurality of computing nodes.

Furthermore, when in operation the transaction system employs the blockchain that is recorded in the ledger. Notably, the transaction system uses a blockchain based technique for carrying out transactions between the two or more transacting parties. The blockchain based technique employs the blockchain for recording transactions and information associated with the transactions, wherein the blockchain refers to a digital database that, when in operation, stores transactions and related records in a chronological manner. Moreover, a block is added to the blockchain for every new transaction that is initiated in the transaction system. The blockchain includes one or more blocks therein. Each of the one or more blocks in the blockchain includes a reference to a previous block. Such a reference to the previous block gives the blockchain a linear structure.

Furthermore, the ledger used for recording the blockchain is a sequential database that includes blocks of data associated with transactions.

In an example embodiment, the ledger is any one of: a public ledger, a private ledger. Furthermore, the ledger arrangement with public (namely, un-permissioned) control of access may be open for every participant of the transactions within the system; however, it will be appreciated that it is highly desirable that data exchanges occurring in respect of the ledger are implemented via signals that are encrypted and/or obfuscated, to resist malicious third-party attacks, corruption or interference, for example in a manner as described with reference to Eq. 1 and Eq. 2. Alternatively, the ledger with private (namely, permissioned) control of access have an access control layer implemented therein; however, as aforesaid, it will be appreciated that it is highly desirable that data exchanges occurring in respect of the ledger are implemented via signals that are encrypted and/or obfuscated, to resist malicious third-party attacks, corruption or interference. Specifically, participants have a control over who can join the transaction system and who can participate in the transactions within the transaction system. Additionally, such a ledger has access protection rights with defined constraints regarding rights to be exploited by the participants.

In an embodiment, the one or more blocks within the blockchain have access rights associated thereto. The access rights allow and/or restrict users (namely, transacting parties, participants and so forth) to read, store, move and modify the data associated with the transactions. Such access rights are beneficially implemented using private-public key encryption, alternatively or additionally, private-public key obfuscation.

Furthermore, the directed acyclic graph (DAG) is utilized for defining relationships between blocks of the blockchain. The directed acyclic graph (DAG) is used for storing data required for processing the transactions within the transaction system; optionally the DAG itself is protected via encryption, for example encryption firewalls. In addition, the directed acyclic graph (DAG) is created for each of the blocks of the blockchain, wherein the directed acyclic graph includes one or more nodes. It will be appreciated that the directed acyclic graph (DAG) is a finite directed graph having no cycles (namely, loop) therein. The directed acyclic graph (DAG) grows in between two consecutive blocks of the blockchain, wherein an end of the directed acyclic graph (DAG) for a given block indicates termination of block-time associated with the given block. Consequently, the termination of block-time associated with the given block allows for addition of new blocks in the blockchain. The block-time associated with each of the given block indicates a time for which transaction associated with the given block is being processed within the transaction system.

As mentioned previously, the ledger is implemented as the distributed ledger that stores references to the start and the end of the DAG, as well as references to one or more contributed smart contracts employed in operation of the transaction system; by employing such a distributed ledger, information pertaining to the ledger is spread in the transaction system, so that failure of a given node of the transaction system cannot represent a single-point-of-failure, thereby vastly increasing transaction system robustness to malicious third party attacks and also equipment failure in one or more of the computing nodes. Notably, the distributed ledger refers to a shared and synchronized digital database that is geographically spread across multiple sites, for example across a plurality of computing nodes of the transaction system. In addition, the distributed ledger does not have a central administrator or centralized data storage. Furthermore, each of the blocks in the blockchain recorded on the ledger includes data associated with the transactions. Such data includes the reference to the one or more contributed smart contracts used in processing (namely, execution) of the transactions in form of an address, a link, an offset to the address and so forth. Additionally, the blocks within the ledger include an address, a link, an offset to a root node and a leaf node of the directed acyclic graph (DAG) for corresponding transactions associated with each of the blocks. It is to be understood that the root node indicates the start of the directed acyclic graph (DAG) and the leaf node indicates the end of the directed acyclic graph (DAG). Beneficially, the references to the one or more contributed smart contracts and the start and end of the directed acyclic graph (DAG) within the ledger allows the participants of the transactions to access the data associated with the transactions. Furthermore, the one or more contributed smart contracts employed in operation of the transaction system include terms and conditions for processing of the transactions within the transaction system.

Furthermore, the smart contracts include at least one human readable contract summary, and following machine-readable aspects: the data specification, the contract body, the initial mining algorithm, and the objective function for scoring the plurality of proposed solutions, wherein the contract body references a problem definition. The human readable form of the contract summary refers to a brief description of problem to be solved and work that has to be done for solving the problem. The contract summary is written in a form that is understandable by participants of the transaction. Furthermore, the contract summary includes problem statement for a given transaction and requirement of the participant associated with the given transaction. In a first example, a smart contract associated with the given transaction for scheduling meetings with a manager may include the contract summary having a problem statement that states "number of persons", "list of time availabilities" and a goal stating requirements of the participant that is "scheduling maximum number of appointments for each of the persons within respective time availabilities associated with them". Additionally, the given transaction (namely, problem) includes a condition that allows only one person to meet the manager in an instance. In addition, the smart contract includes data required for the given transaction in machine-readable form that is not understandable by humans. Beneficially, the data in machine-readable form allows the plurality of computing nodes to understand and process the data associated with the transactions. Therefore, the data in machine-readable form allows for an efficient and substantially faster processing of the transactions. The machine-readable data included in the smart contract comprises data specifications, wherein the data specifications include attributes related to data required for executing the transactions. Referring to the first example, the data specifications include "list of time slots", "timetable" and "meetings". Moreover, the smart contract includes the contract body, wherein the contract body includes the problem definition (parameters and other details associated with the problem) that is to be solved for fulfilling the terms and conditions within the smart contract. In addition, the contract body includes contract function(s) and state preserving function(s), wherein the contract function(s) allows a transacting party (namely, a first participant) to place a transaction order, comprising details of the given transaction, and confirm when a solution is achieved. Furthermore, the state preserving function(s) allows the first participant to enquire about the solution. Referring to the first example, the contract function(s) allows the first participant to request a meeting giving "a list of time availabilities" and to "confirm a proposed time slot" by employing the smart contract. Furthermore, the state preserving function(s) allows the first participant to inquire regarding a currently assigned time slot.

Furthermore, the initial mining algorithm included in the smart contract defines an approach to solve the problem defined in the contract body associated with the given transaction. The initial mining algorithm allows for optimization of the problem included in the smart contract associated with the given transaction. Referring to the first example, the initial mining algorithm may be a scheduling algorithm for scheduling meeting with the manager from list of available time slots. The initial mining algorithm is used by one or more participants in the given transaction for solving the problem in the contract body of the smart contract associated with the given transaction. Moreover, the participants can optionally modify the initial mining algorithm in order to obtain optimized and better solutions for the problem in the given transaction. Beneficially, such optimization allows for better and optimized solutions by creating a competitive scenario between participants of the given transaction. The participants can access the smart contract and the transaction order in order to retrieve details of the given transaction associated with the given transaction and the initial mining algorithm for solving the problem in the contract body of the smart contract associated with the given transaction. Furthermore, the objective function is employed to compare a plurality of solutions provided by the participants of the given transaction. In addition, the objective function maps the plurality of solutions to a score. The score provided to the solutions is optionally a numerical value, an alphabetical grade, a ranking and so forth. In an example, a lower score that is, having a low numerical value may be considered as a parameter for better performance. Therefore, the objective function allows for evaluating the plurality of solutions and determining a specific solution having best result for the problem included in the smart contract.

Optionally, the smart contract includes a plurality of objective functions for evaluating the solutions provided by the participants of the given transaction. Furthermore, the solutions provided by the participants of the given transaction remain valid as long as the solutions serve the terms and conditions mentioned in the smart contract. In addition, validity of the solutions provided by the participants of the given transaction is having an objective value thereof and is considered to be less than infinity.

Optionally, the initial mining algorithm and the objective function operate on other functions rather than on data associated with the given transaction. In an example, the initial mining algorithm and the objective function works on training of one or more machine learning algorithms. In such an example, an optimal solution may be an optimal set of parameters (such as network weights, hyper parameters and so forth) that yield most optimized classifications, or another optimal solution may be architectures including the network layout and the like. In addition, the mechanisms of the proposed solutions may not be constrained, except for interface for accessing the transaction system, however the proposed solutions could be further constrained according to the objective function. For example, the objective function could incorporate a penalty on proposed solutions that comprise large storage space (e.g. a large neural network might be hundreds of megabytes); and objective functions priorities earlier solutions with identical or higher performance.

Optionally, the objective function includes a fixed test-set for analysing the proposed solutions and determining scores for the proposed solutions, wherein the test-set includes data attributes, algorithms, and the like for testing parameters like time complexity and processing complexity associated with the proposed solutions. In addition, the test-set confirms if the proposed set complies with requirements (namely, terms and conditions) mentioned in the smart contract. Furthermore, optionally, the objective function includes a test-set generator instead of the fixed test-set. Therefore, the test-set generator generates a unique and random test for each of the proposed solutions. Beneficially, such generation of unique and random test-set prevents the transaction system against the proposed solutions that overfit to a fixed test, wherein overfitting refers to learning data patterns up to an extent that negatively affects performance of the proposed solutions by reducing scope of improvement and innovation. Therefore, overfitting diminishes generalizability of the proposed solutions to new data. Furthermore, complexity of the test-set generator varies with problem definition; in an instance the objective function can have a large fixed public test dataset and can extract a subset of the fixed public test dataset for each block using a private pseudo-random number generator.

Optionally, the test set generator of the objective function is delayed from publication of the test-set in the block associated therewith. For instance, in one embodiment of, first proofs-of-work are published in the directed acyclic graph (DAG) by the participants of the transaction at block time N, then the proposed solutions are published by the participants of the transaction in the directed acyclic graph (DAG) at block time N+I and finally the test-set is published by the objective function at time N+2 by hashing all of the published proposed solutions and using a resulting number to initialize a pseudo-random number generator that selects a subset of data for evaluation of the proposed solutions. In addition, the evaluation of the proposed solutions is delayed using newly disclosed data for evaluation of the proposed solutions. Beneficially, the objective function requires the test-set generator for evaluating performance of the proposed solutions. The objective function exhibits an inherent variance in performance measures depending upon size of subsets of data for evaluation of the proposed solutions. Optionally, the objective function in the smart contract specifies a performance level in form of score beyond which the problem is considered closed and no further performance improvements can be relied upon if they are smaller than variance in subset of data for evaluation of the proposed solutions. Consequently, a chance of fake or ingenuine participants proposing the solutions get reduced as random subset of data leads to uncertainty in evaluation of the proposed solutions. In an instance, when a fee is required for proposing a solution, it becomes an offset against attacks and flood of fake proposed solutions by unauthorized participants in the transaction.

Furthermore, the DAG comprises the plurality of proposed solutions to problems posed in the smart contracts. Notably, each of the plurality of proposed solutions the transaction system is stored on one of the nodes of the directed acyclic graph. In other words, each of the nodes in the directed acyclic graph (DAG) includes one of the plurality of proposed solutions. The directed acyclic graph (DAG) continues to grow that is a depth of the directed acyclic graph (DAG) continues to increase as long as a count of solutions to the problems posed in the smart contract continues to increase. In an example, when only one solution to a problem posed in the smart contract is proposed, the directed acyclic graph (DAG) may comprise a single node. In another example, when five solutions are proposed for a problem posed in the smart contract, the directed acyclic graph (DAG) may comprise five nodes. Notably, an end in the increase in depth of a given directed acyclic graph (DAG) leads to end of block-time associated with the transaction for which the proposed solutions are stored in the given directed acyclic graph (DAG). Therefore, the directed acyclic graph (DAG) contains the proposed solutions to the problem posed in the smart contract. In addition, the depth of the directed acyclic graph (DAG) determines a time for which transaction associated therewith executes.

Furthermore, the DAG stores data and/or extended algorithm code to reduce computing resources being used on the distributed ledger and to allow trimming of information that is no longer required, as new solutions emerge during operation of the transaction system. Furthermore, the directed acyclic graph (DAG) is operable to store temporary data (such as references, variables, values and the like) used in executing transactions within the transaction system. Notably, such storage of temporary data in the directed acyclic graph (DAG) saves storage space of the ledger that is spent on each transaction. Consequently, reduces processing required for accessing the temporary data for executing the transactions. Moreover, the directed acyclic graph further includes parts of initial mining algorithm that are added after the elements of the smart contract are defined and stored in the blockchain. Notably, such addition of parts of initial mining algorithm at a later point in time allows for making changes in the smart contract dynamically. Beneficially, such dynamic structure of the smart contract allows the participants of the transaction to make changes in the transaction while the transaction is executing. In addition, the data and additional algorithm stored in the directed acyclic graph (DAG) can be removed as and when it is not required. In an example, the nodes of the directed acyclic graph may be deleted for removal of such data and additional algorithm. In another example, the data in nodes of the directed acyclic graph (DAG) may be deleted in order to remove such data and additional algorithm.

Optionally, the directed acyclic graph (DAG) further includes one or more objective functions to be used for evaluating the proposed solutions to the problems posed in the one or more contributed smart contract.

Optionally, the transaction system generates, when in operation, the smart contract at a system creation with a problem statement of optimizing transaction orders for adding new blocks to the blockchain. Notably, the transaction orders refer to one or more requirements posed by the first participant of the transaction. In an example, the one or more requirement may be scheduling maximum number of meetings in a given time span. Moreover, the system creation refers to a module (namely, arrangement) within the transaction system that is employed for determining terms, conditions and other parameters to be included in the smart contract for processing the transactions. Additionally, the system creation point is responsible for including transaction details associated with the given transactions to the one or more smart contracts contributed to the given transaction. The system, while in running state generates the smart contract comprising the problem statement (such as a mathematical problem, a software product and the like) meant for fulfilling the transaction order.

Optionally, the transaction system operates to accommodate the smart contract by defining a problem that is to be solved, giving a plurality of parties of the transaction system an opportunity to earn a quantity of fiat currency or other consideration by proposing solutions to the problem. Furthermore, the plurality of parties (namely, miners) in the transaction system participate in the given transaction and propose solutions for the problem that is to be solved. In an instance, when a solution proposed by the miner is confirmed and is used then the specific miner is incentivized (namely, rewarded) for his/her work. Notably, the incentive (namely, reward) is provided in way of a fiat money (namely, a legal tender by a government decree), a token that is to be used within the transaction system, a cryptocurrency. In addition, the incentive is provided in form of rights (to access, modify, control and the like) within the transaction system. The incentive is provided by the transacting party who has placed the transaction order associated with the given transaction.

Optionally, the given transaction can employ one or more smart contracts for execution thereof.

Optionally, the transaction system operates to accommodate the given smart contract by defining following elements of the given smart contract: a summary of the given smart contract; a data specification for the given smart contract; a contract body of the given smart contract; a mining algorithm to be used in conjunction with the given smart contract; and an objective function of the given smart contract. Furthermore, the elements of the smart contract are included by the system once the elements and data attributes associated with the elements get defined. The elements of the smart contract are defined by at least one of the plurality of parties (such as the transacting party, the smart contract proposer) of the system. Alternatively, the elements of the smart contract are defined by an external entity (such as an individual, an algorithm and the like) having an expertise for defining the elements of the smart contract. In addition, the external entity is employed by the transacting party who has placed the transaction order associated with the given transaction.

Optionally, a monetary fee is applied for submitting the smart contract. Optionally, the transaction order is placed by the transacting party in the ledger. Alternatively, optionally, the transaction order is placed by the transacting party in a temporary memory location. Furthermore, the participants of the given transaction belong to the plurality of parties of the transaction system. Optionally, the plurality of parties of the system include at least: a transacting party, a smart contract proposer, a miner, a leader.

Furthermore, the transacting party is an entity (a person, an organization, an institute and the like) who has a stake in the transaction. In addition, a transaction can have one or more transacting parties. Moreover, the smart contract proposer is an entity (a person, an organization, an institute and the like) who is responsible for creation of the smart contract. Notably, the smart contract proposer defines the elements of the smart contract by keeping requirements of the transacting party in consideration. Furthermore, the system includes one or more miners who participate in the transactions for proposing solutions to the problems mentioned in the one or more contributed smart contracts. A miner is incentivized by the transacting party when solution proposed by the miner is used by the transacting party. Furthermore, the leader is elected by the plurality of parties in the transaction system. The leader is elected from a pool of candidates for leadership, wherein, in an instance, the miners can be candidates for the leadership. The plurality of parties is allowed to vote for electing the leader, wherein the leader is responsible for carrying out the transactions within the transaction system. The plurality of parties who vote for electing the leader, put forth a stake directly proportional to voting strength thereof toward leadership candidates. When voting is complete a candidate is probabilistically selected according to a distribution of voting stakes. Notably, the leader is elected for a block-time associated with block of the given transaction. In an example, a candidate with a 51% majority of voting stake has a 51% probability of being elected for the leadership.

Furthermore, optionally, the leader determines an ordering (namely, sequence) of the transactions within the transaction system. In addition, the leader is responsible for adding new blocks to the ledger. The leader can optionally form a merkle tree (namely, a hash tree) for determining the ordering of the transactions, wherein the merkle tree relates to a hierarchical structure (namely, a tree structure) in which every leaf node is a hash of a block of data related to a given transaction and each non leaf node is a hash of its child node, wherein each non-leaf node can have up to two child nodes. Alternatively, the ordering of the transactions within the transaction system is determined by solutions (namely, algorithms) proposed by the miners. Notably, the new block is added to the blockchain once an optimized solution for the problem is achieved. In an instance, when the optimized solution is not achieved, the new block is added to the merkle tree. Beneficially, the merkle tree acts as a back up for undisrupted operation of the transaction system.

Optionally, the leader is provided with financial remuneration in form of a fraction of transaction fee applied for transactions in the merkle tree. The leader can also be provided with additional rights within the system. In addition, the leader can also be provided with fiat currency added through controlled inflation.

Optionally, the leader is responsible for terminating the block-time associated with the block of the given transaction. The block-time of the given transaction is terminated in an instance when optimized solution is achieved. In addition, the block-time of the given transaction is terminated in an instance when the transacting party no longer desires to achieve the optimized solution. Furthermore, the leader is elected by establishing a consensus within the system when the system is in operation.

Optionally, the system employs in operation a proof-of-stake (PoS) as a consensus mechanism for ensuring, when the transaction system is in operation, that the blocks for the blockchain are mined quickly. The consensus mechanism refers to a technique for achieving agreement within the system for election of the leader, a new transaction, addition of a new block and the like. The proof-of-stake (PoS) technique of establishing consensus within the system allows a participant to propose a solution and/or vote for electing the leader based on a stake owned by the participant, wherein consensus refers to an agreement within the system for the proposed solution and/or elected leader. Notably, the stake put forward by the plurality of parties can be in form of tokens that represent a value or quantity, for example a quantity of considerable, for example as aforementioned. Optionally, the consideration includes, at least in part, a fiat money, a digital currency (i.e. tokens/coins) that is used for other smart ledger transactions (such as making purchases), in which case the digital currency is effectively frozen for a duration of a next leadership, that is the stakeholder will not be able to use the digital currency for a current leadership period. Such a manner of operation provides a trade-off between liquidity and voting strength for the plurality of parties which may be a desirable property of digital economy. Alternatively, the voting stake may be in form of a token representative of technical consideration, for example a digital currency specifically used for voting in order to elect the leader, which gives better system-level control of voting rights. Moreover, the consensus mechanism allows the leader to add new blocks to the blockchain as soon as any one of the proposed solutions is confirmed by the transacting party. Alternatively, the leader adds new blocks to the block chain as soon as a specific score by the objective function is achieved for the proposed solution. Optionally, the proposed solution confirmed by the transacting party is written in block associated with transaction thereof. Notably, this confirmation substantially reduces a time spent in adding new blocks to the blockchain as the leader is responsible for it and has consensus of the plurality of parties within the system. Therefore, the transactions within the transaction system get executed promptly, for example within a period of 10 minutes, more optionally within a period of 10 seconds.

Optionally, a random candidate is elected as the leader for each blocktime. Optionally, the consensus mechanism employs proof-of-work (PoW) for establishing consensus within the transaction system.

Optionally, the miners submit proof-of work along with the proposed solutions thereof. In an instance, when any one of the miners wish to add a proposed solution to solve the problem posed in the smart contract, the miners do not initially upload the proposed solution first; instead, at a first block-time during a block-time the miners publish on the directed acyclic graph (DAG) a hash of the proposed solution and public key, the public key and a digital signature thereof. Consequently, at a second block-time during the block-time the miners publish on the directed acyclic graph (DAG): a proposed solution, the public key and the digital signature. Therefore, the miners ensure that a correct and fine-grained (namely, detailed) and timestamped proposed solution is published on the directed acyclic graph (DAG), thereby securing the miners against submission against competing miners, and keeping the proposed solution private until the following block. At the second block-time, the proposed solutions are evaluated, and, optionally, one or more miners are selected for remuneration. Beneficially, the timestamped proposed solutions allow to determine at least one of the miners who is first to achieve the solution and is incentivized based on performance and precedence associated therewith.

In an example, when initial proposed solutions are published on the directed acyclic graph and are highly performant, improvement in the proposed solution increases very little as a depth of an associated directed acyclic graph (DAG) increases. Therefore, very little increase in incentives is provided to the miners. In another example, when initial proposed solutions are poorly performant, as a depth of the directed acyclic graph associated therewith increases, a significant increase in performance can be observed. Therefore, incentives provided to the miners increases. In an example embodiment, when an optimized solution is achieved, improvement is performance of the proposed solution also decreases. Hence, the incentives provided to the miners decreases.

Optionally, the system is implemented using one more network security techniques, for example encryption, decryption and obfuscation, or any combination of these. Notably, the one or more security techniques protect the system against network attacks such as denial of service, flooding attacks, sinkhole attacks, phishing attacks and the like. In addition, the network security techniques prevent unauthorized participants from accessing the transaction system. In an example, such network security techniques may include use of encryption techniques, for example as aforementioned, for securing data within the system, providing the plurality of parties with passwords, digital signature and encryption keys for proving an authorization thereof. The plurality of parties has to prove authorization thereof prior to participating in the transactions.

Optionally, the transaction system is implemented using one or more software applications that are downloadable to the plurality of computing nodes for interfacing with the transaction system. The participants of the system are allowed to access the transaction system via the plurality of computing nodes. The plurality of computing nodes comprises one or more interfaces, for example graphical user interfaces (GUI), between the plurality of parties and the transaction system. Notably, the interface between the plurality of parties and the transaction system is provided by the software applications downloaded on the plurality of computing device. In an example, the software application may be downloaded from a portal associated with the transaction system. In another example, the software application may be installed on the plurality of software applications by way of an installation medium.

Optionally, the plurality of computing nodes has a database module for storing the software applications and data associated with the transactions within the transaction system.

In an implementation of the present invention, a transacting party may submit a transaction order in a temporary work pool. Subsequently, a smart contract is proposed for executing a transaction associated with the transaction order. Subsequently, a block is created in a blockchain recorded on a ledger. The block contains references to the smart contract and references to a start and an end of a directed acyclic graph meant for the transaction. Furthermore, miners may access the ledger and retrieve a problem in the transaction order as well as an initial mining algorithm for solving the problem. The miners may modify the initial mining algorithm for solving the problem and propose solutions therefor. Subsequently, the miners publish the proposed solutions on nodes of the directed acyclic graph. Furthermore, the proposed solutions are evaluated using an objective function within the smart contract and a score is given to each of the proposed solutions. The transacting party is allowed to choose proposed solution based on the score provided by the objective function. Optionally, the proposed solution is added to the block once the transacting party confirms the proposed solution. The miner responsible for publishing the proposed solution is incentivized by the transacting party. Optionally, the miner is incentivized by a third party using the proposed solution.

The present disclosure also relates to the method as described above. Various embodiments and variants disclosed above apply mutatis mutandis to the method. Optionally, the DAG further includes parts of the initial mining algorithm that are added after machine-readable elements of a given smart contract are defined and stored in the blockchain, wherein the DAG allows participants of the given transaction to make changes in the given smart contract during the execution of the given transaction. Optionally, the method further includes arranging for the transaction system to employ in operation the proof-of-stake (PoS) as the consensus mechanism for ensuring, when the transaction system is in operation, that the blocks for the blockchain are mined quickly, for example within a period of 10 minutes, more optionally within a period of 10 seconds. Optionally, the method further includes arranging for the transaction system to generate, when in operation, the smart contract at the transaction system creation with the problem statement of optimizing transaction orders for adding new blocks to the blockchain. Optionally, the method further includes operating the transaction system to accommodate the given smart contract defining the problem that is to be solved, giving the plurality of parties of the transaction system the opportunity to earn the quantity of fiat currency or other consideration by proposing solutions to the problem.

Optionally, the method further includes operating the transaction system to accommodate the given smart contract by defining following elements of the given smart contract:
(i) the summary of the given smart contract;
(ii) the data specification for the given smart contract;
(iii) the contract body of the smart contract;
(iv) the mining algorithm to be used in conjunction with the given smart contract; and
(v) the objective function of the given smart contract.

Optionally, the method further includes implementing the transaction system using software applications that are downloadable to the plurality of computing nodes for interfacing with the transaction system.

Optionally, the method further includes the plurality of parties of the transaction system include at least: the transacting party, the smart contract proposer, the miner, the leader.

Optionally, the method further includes implementing the transaction system using one more network security techniques, for example encryption, decryption and obfuscation, or any combination of these. Notably, the one or more security techniques protect the system against network attacks such as denial of service, flooding attacks, sinkhole attacks, phishing attacks and the like. In addition, the network security techniques prevent unauthorized participants from accessing the transaction system. In an example, such network security techniques may include use of encryption techniques, for example as aforementioned, for securing data within the transaction system, providing the plurality of parties with passwords, digital signature and encryption keys for proving an authorization thereof. The plurality of parties has to prove authorization thereof prior to participating in the transactions.

DETAILED DESCRIPTION OF THE DRAWINGS

Figure 1:
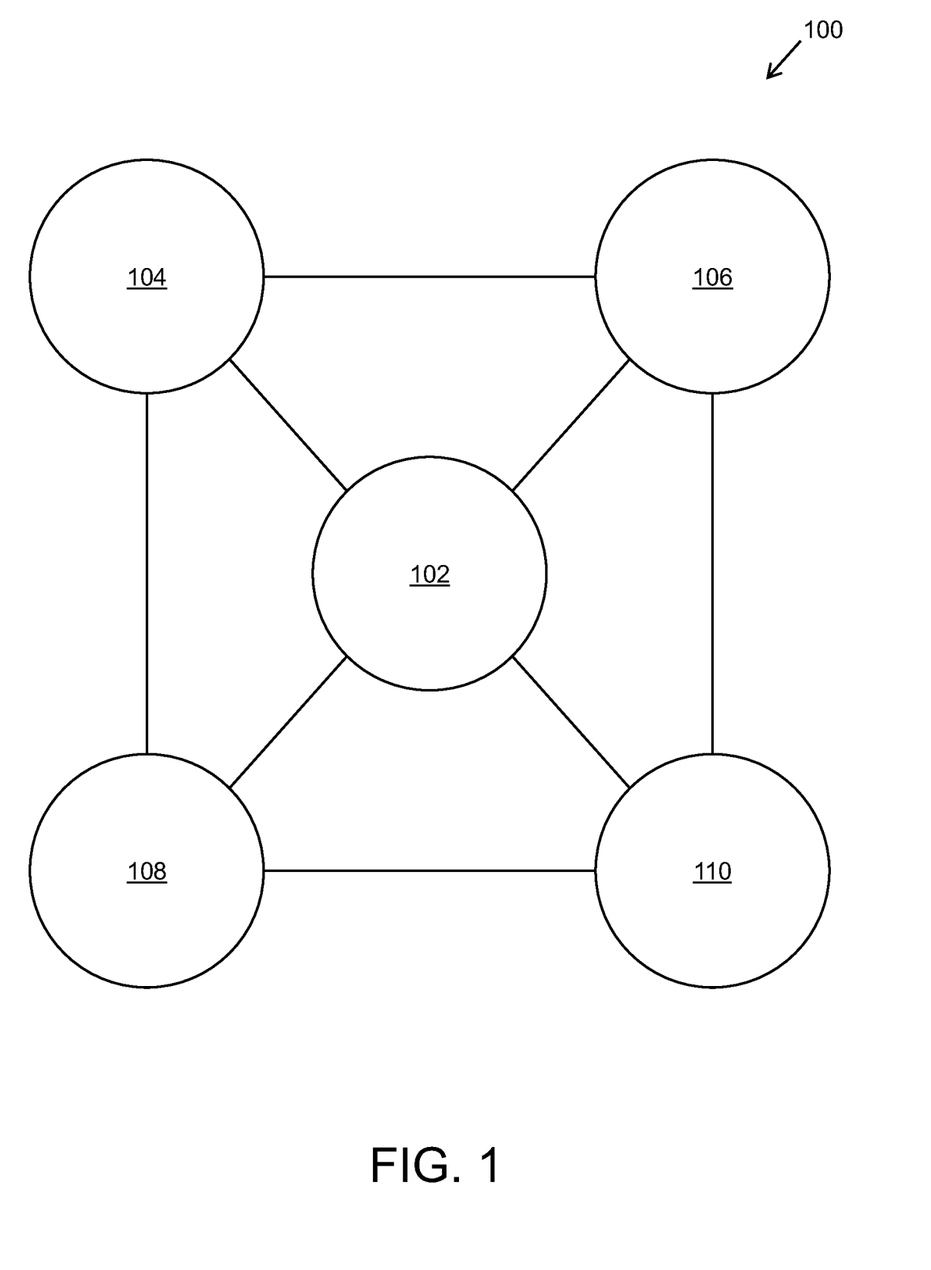
FIG. 1 is an illustration of a transaction system, in accordance with an embodiment of the present disclosure.

Referring to FIG. 1, there is provided an illustration of a transaction system 100, in accordance with an embodiment of the present disclosure. The transaction system 100 includes a plurality of computing nodes (depicted as computing nodes 102, 104, 106, 108 and 110) that are mutually interconnected via a data communication network, wherein, when in operation, the transaction system 100 employs a blockchain that is recorded in a ledger, wherein a directed acyclic graph (DAG) is utilized for defining relationships between blocks of the blockchain. It may be understood by a person skilled in the art that the FIG. 1 includes a simplified illustration of the transaction system 100 for sake of clarity only, which should not unduly limit the scope of the claims herein. The person skilled in the art will recognize many variations, alternatives, and modifications of embodiments of the present disclosure.

Figure 2:
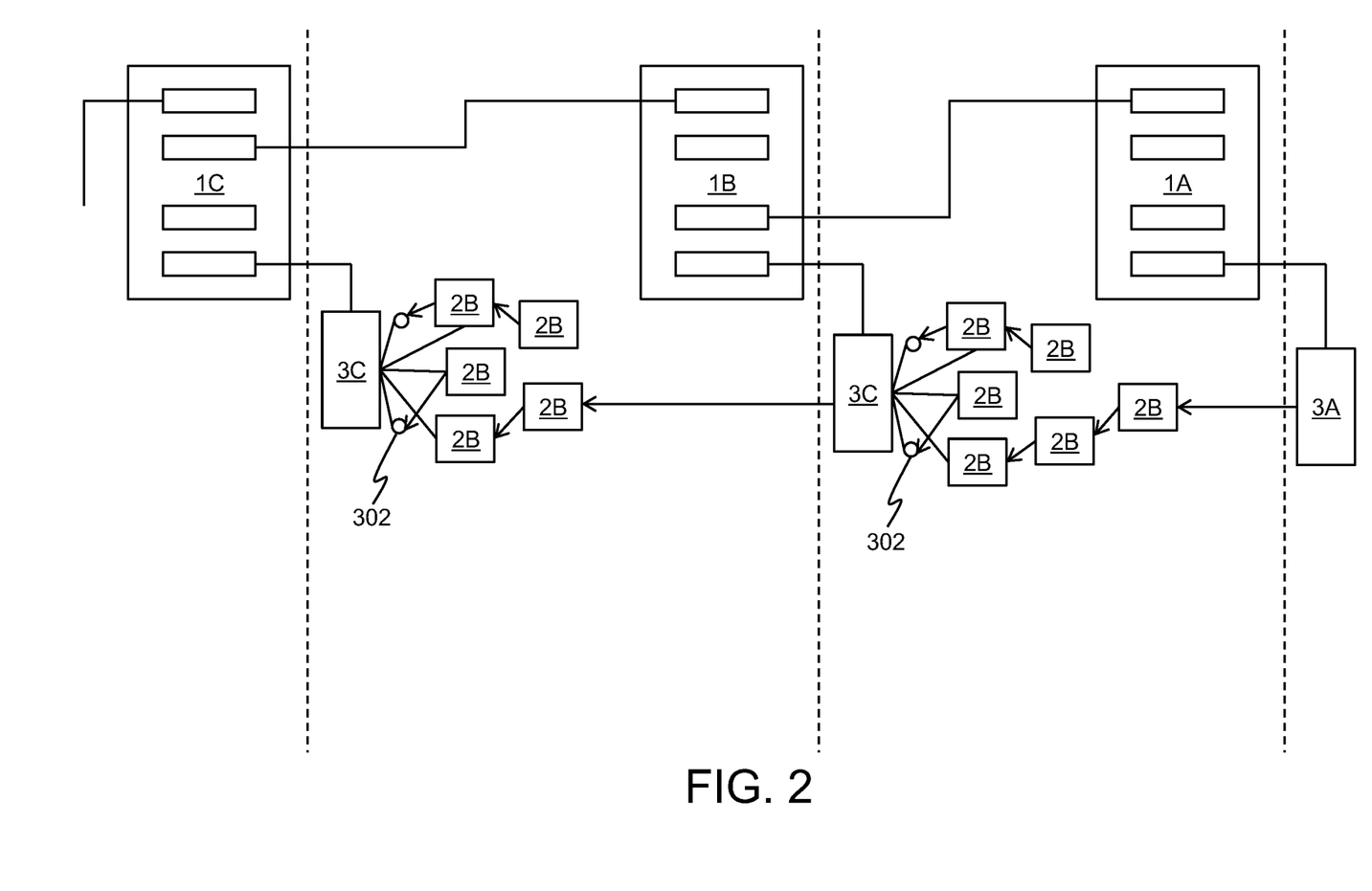
FIG. 2 is an illustration of a schematic illustration of the transaction system of FIG. 1 in operation, in accordance with an embodiment of the present disclosure.

Referring next to FIG. 2, there is provided an illustration of a schematic illustration of the transaction system 100 of FIG. 1 in operation, in accordance with an embodiment of the present disclosure. As shown, the blocks 1A, IB and 1C are blocks containing references to a start and an end of the DAG, as well as references to one or more contributed smart contracts forming the ledger. Furthermore, each block is connected to a previous block within the ledger that is block 1C is connected to previous block IB and further IB is connected to 1A. Additionally, dashed lines in the FIG. 2 show a block period (namely, block time). In each of the block periods, a plurality of parties elects a leader that is operable to decide a consensus for next block to be entered in the ledger. Furthermore, a plurality of parties (depicted as a party 3A) is an elected leader for the block period associated with the block 1A. Moreover, votes 302 for the plurality of parties are provided based upon a plurality of proposed solutions 2A to problems posed in the smart contracts. Subsequently, such votes 302 are used to elect a leader 3B for a next block period. The elected leader 3A is operable to close the block 1A by publishing the most optimal piece of work thereof. Furthermore, the elected leader 3B in the block period associated with block IB and other plurality of parties provides a plurality of proposed solutions 2B of performing plurality of general-purpose computing tasks. Moreover, based on the plurality of proposed solutions 2B, votes for electing leader for next block 1C are casted. The elected leader 3B is operable to close the block IB by publishing the most optimal piece of work thereof. Subsequently, 3C is elected as leader for block period associated with block 1C. Moreover, votes 302 for the plurality of parties are provided based on plurality of proposed solutions 2C. Subsequently, such votes 302 are used to elect a leader for a next block period (not shown). The elected leader 3C for block 1C is operable to close the block 1C by publishing the most optimal piece of work thereof.

It will be appreciated by a person skilled in the art that FIG. 2 is merely an example, which should not unduly limit the scope of the claims herein. The person skilled in the art will recognize many variations, alternatives, and modifications of embodiments of the present disclosure.

Figure 3:
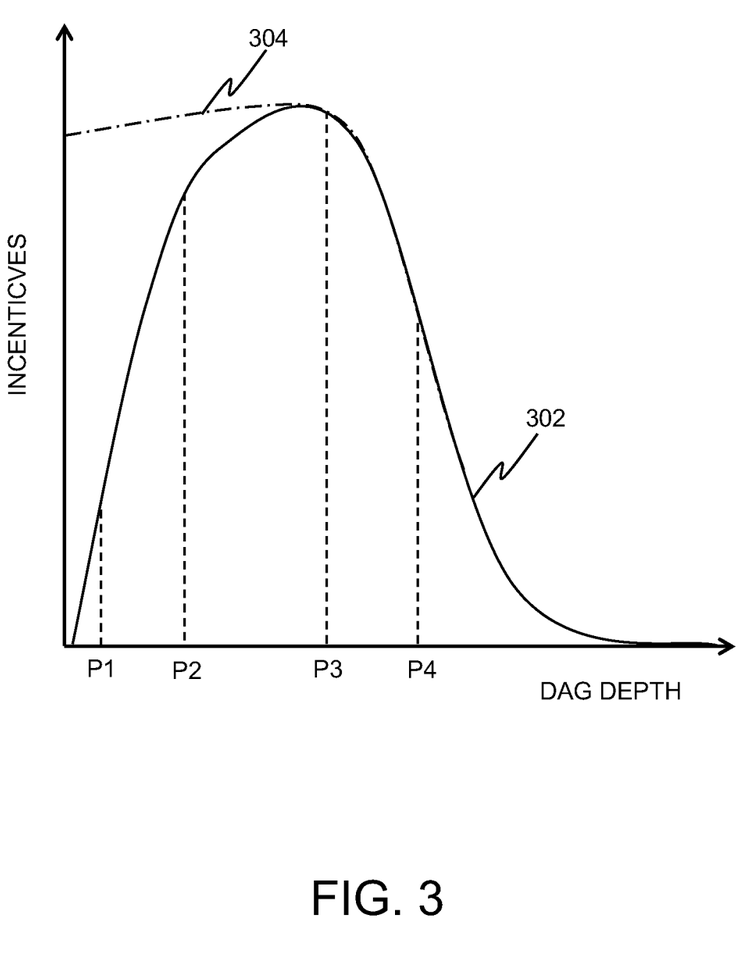
FIG. 3 is an illustration of a graphical representation of an operating performance of the transaction system of FIGS. 1 and 2, in accordance with an embodiment of the present disclosure.

Referring next to FIG. 3, there is provided an illustration of a graph providing an operating performance of the transaction system 100 of FIGS. 1 and 2, in accordance with an embodiment of the present disclosure. As shown, an abscissa X-axis (namely, a horizontal axis) represents a depth of the DAG, and an ordinate Y-axis (namely, a vertical axis) represents incentives. Furthermore, the graphical representation depicts the expected incentives as a function of the depth of the DAG Moreover, a solid line 302 depicts a first problem and dotted line 304 depicts a second problem with initial solutions being substantially poorly or highly performant, respectively. At a point PI, the initial solutions associated with the aforesaid problems are executed many times, wherein the initial solutions are substantially far from an optimal solution. At a point P2, subsequent solutions associated with the aforesaid problems emerge, thereby improving performance substantially. At a point P3, near optimal solutions associated with the aforesaid problems are found. At a point P4, later solutions associated with the aforesaid problems emerges, thereby offering minimal improvement.

Figure 4:
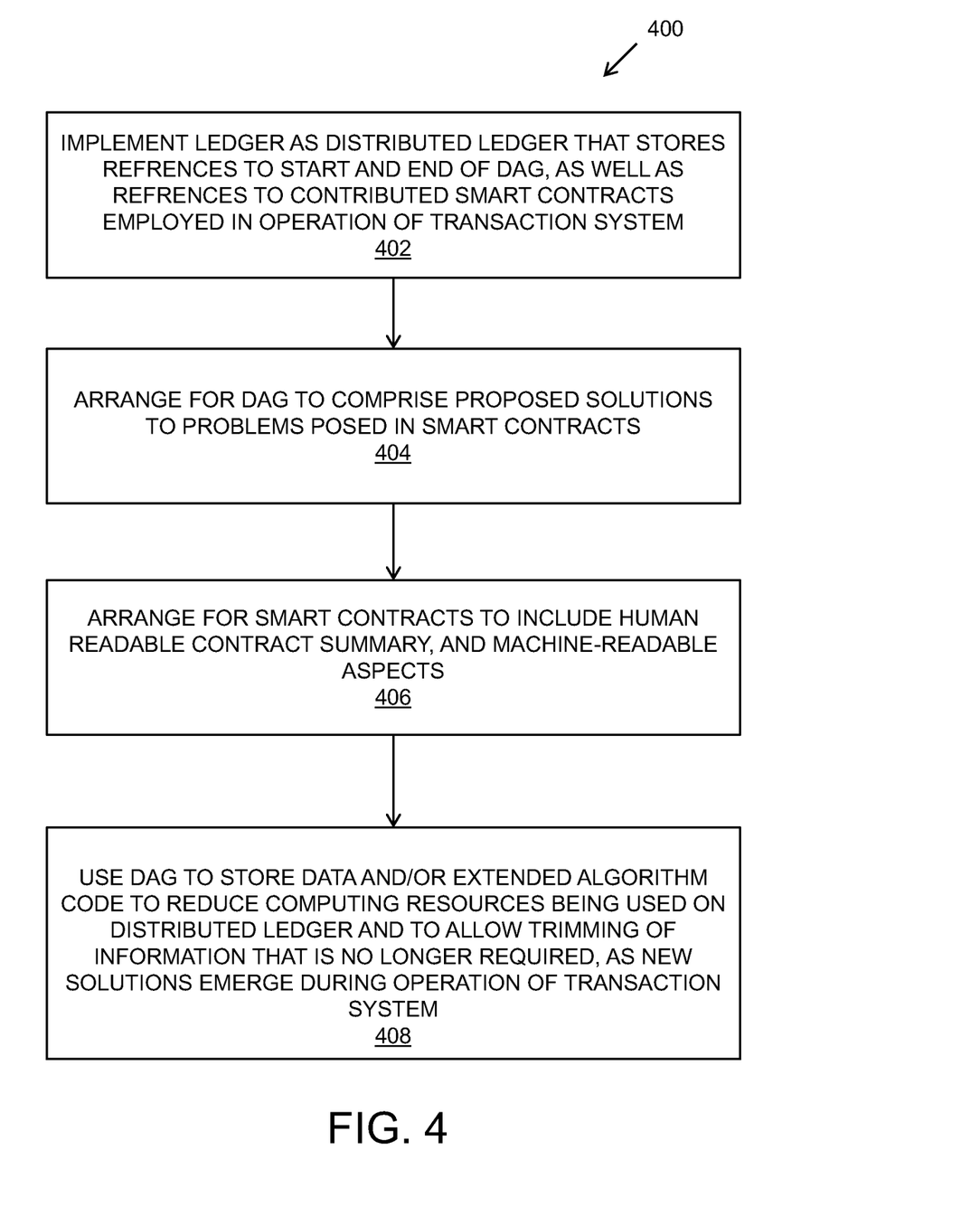
FIG. 4 is an illustration of steps of a method of (namely, a method for) operating a transaction system, in accordance with an embodiment of the present disclosure.

Referring next to FIG. 4, there is provided an illustration of a flow chart of steps of a method 400 of (namely, a method for) operating a transaction system, in accordance with an embodiment of the present disclosure; for example, the transaction system is implemented as described in the foregoing. In the method 400, the transaction system includes a plurality of computing nodes that are mutually interconnected via a data communication network, wherein, when in operation, the transaction system employs a blockchain that is recorded in a ledger, wherein a directed acyclic graph (DAG) is utilized for defining relationships between blocks of the blockchain. At a step 402, the ledger is implemented as a distributed ledger that stores references to a start and an end of the DAG, as well as references to one or more contributed smart contracts employed in operation of the transaction system. At a step 404, the DAG is arranged to comprise a plurality of proposed solutions to problems posed in the smart contracts. At a step 406, the smart contracts are arranged to include at least one human readable contract summary, and following machine-readable elements: a data specification, a contract body, an initial mining algorithm, and an objective function for scoring the plurality of proposed solutions, wherein the contract body references a problem definition. At a step 408, the DAG is used to store data and/or extended algorithm code to reduce computing resources being used on the distributed ledger and to allow trimming of information that is no longer required, as new solutions emerge during operation of the transaction system. In the method 400, data communications between computing nodes of the transaction system are encrypted and/or obfuscated, for example in a manner as aforementioned, to reduce a risk of malicious third-party attacks disrupting functioning of the transaction system.

The steps 402 to 408 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a nonexclusive manner, namely allowing for items, components or elements not explicitly described also to be present. Reference to the singular is also to be construed to relate to the plural.

APPENDIX

Elements of an example smart contract for executing within the aforesaid transaction system of the present disclosure are elucidated in greater detail below:

| Smart contract | |
|---|---|
| Contract summary | Given N persons, each with a list of time availabilities, optimize the appointments to maximize the usage of time. program ai.fetch.agenda; |
| Data specification | global requests : TemporaryDict< PublicKey, List< TimeSlot > >; global timetable : TemporaryDict< PublicKey, TimeSlot >; global meetings : Dict< PublicKey, TimeSlot >; |
| Contract body | contract function CommitToMeeting(PublicKey public_key, List<TimeSlot> availability)   requests[public_key] = availability; endfunction function GetProposedTime(public_key)   if(not timetable.Contains(public_key)) throw;   return timetable[public_key]; endfunction contract function AcceptProposedTime(Signature signature)   if(not timetable.Contains(public_key)) throw;   meetings[public_key] = timetable[public_key];   delete requests[public_key];   delete timetable[public_key]; endfunction |
| Mining algorithm | mining function MineTimeTable(Dict< PublicKey, List<TimeSlot> > requests)   var solution : Dict< PublicKey, TimeSlot >;   for(request in requests)     solution[request first] =request.second[0];   endfor   return solution; endfunction |
| Objective function | objective function MeetingObjective(List< Pair< PublicKey, TimeSlot > > solution)   var start = Time("1st Jan 3000 12:00");   var end = Time("1st Jan 1970 12:00");   var used : List< TimeSpan >;   for(p in solution) |

APPENDIX-continued

Elements of an example smart contract for executing within the aforesaid transaction system of the present disclosure are elucidated in greater detail below:

Smart contract

```
        if p.second in used;
          return infinite;
        endif
        used.Append( p.second );
        start = min(start, p.second.start);
        end = max(end, p.second.end);
      endfor
      return (start − end).AsSeconds( );
      endfunction
```

The invention claimed is:

1. A transaction system that includes a plurality of computing nodes that are mutually interconnected via a data communication network to exchange encrypted data representative of consideration therebetween, wherein, when in operation, the transaction system employs a blockchain whose entries are recorded in a ledger, wherein a directed acyclic graph, DAG, is utilized for defining relationships between blocks of the blockchain, wherein:

(a) the ledger is implemented as a distributed ledger that stores references to a start and an end of the directed acyclic graph (DAG), as well as references to one or more smart contracts employed in operation of the transaction system, wherein the one or more smart contracts define the consideration that is to be exchanged in response to provision of proof of completion of work;

(b) the directed acyclic graph (DAG), comprises a plurality of proposed solutions to problems posed in the one or more smart contracts, wherein each node in the directed acyclic graph (DAG) includes one solution of the plurality of proposed solutions;

(c) each of the one or more smart contracts includes machine-readable elements including a data specification, an initial mining algorithm, an objective function for scoring the plurality of proposed solutions-including a test-set generator to generate a unique and random test set for each of the proposed solutions, wherein the system is configured to publish the test set at a block time greater than the block time for publication of the proposed solutions in the directed acyclic graph by initializing a pseudo-random number generator that selects a subset of data for evaluation of the proposed solutions;

(d) the transaction system operates to cause the directed acyclic graph (DAG) to store temporary data and/or extended algorithm code used during an execution of a given transaction, wherein the transaction system is configured to remove temporary data and/or extended algorithm code stored in the directed acyclic graph (DAG) once the execution of the given transaction is complete, and further wherein the temporary data and/or extended algorithm code stored in the directed acyclic graph (DAG) is modified in response to new solutions arising during operation of the transaction system, wherein the directed acyclic graph (DAG) further includes parts of the initial mining algorithm that are added after machine-readable elements of a given smart contract are defined and stored in the blockchain, such that the transaction system allows participants of the given transaction to make changes in the given smart contract during the execution of the given transaction, wherein the directed acyclic graph (DAG) is configured to grow between two consecutive blocks as the number of solutions to the problem posed in smart contract increase, wherein the objective function is configured to specify a performance level in form of a score beyond which proposed solutions are sub-optimal, wherein the transaction system is configured to terminate computing of sub-optimal proposed solutions and to terminate a block-time for a block based on an indication given by the end of the directed acyclic graph (DAG), when an optimized solution is achieved or when an optimized solution is not required by a transacting party associated with a computing node.

2. The transaction system of claim 1, wherein the transaction system employs in operation a proof-of-stake (POS) as a consensus mechanism for verifying, when the transaction system is in operation, updated entries to be made in the distributed ledger.

3. The transaction system of claim 1, wherein the one or more smart contracts are able, when executed within the transaction system, to change dynamically one or more addresses of parties to the one or more smart contracts.

4. The transaction system of claim 1, wherein the transaction system operates to accommodate a given smart contract defining a problem that is to be solved, giving a plurality of parties of the transaction system an opportunity to receive consideration when the problem is solved, and wherein the consideration is a quantity representing at least one of: an access to data storage, an access to data memory, an access to data communication system bandwidth, access to data communication channels or ports, data processor energy use, data processor energy dissipation, an access time taken by data processing resources during transactions, heat generation in computing hardware, cooling energy applied to computing hardware or any other measure associated with one or more CPU cycles.

5. The transaction system of claim 1, characterized in that the transaction system is implemented using one or more software applications that are downloadable to the plurality of computing nodes for interfacing with the transaction system, wherein the plurality of computing nodes provide access to one or more parties of the transaction system, wherein the one or more parties include at least one of: a transacting party, a smart contract proposer, a miner, a leader.

6. The transaction system of claim 1, wherein the transaction system is further configured to encrypt and/or obfuscate data communications occurring among the plurality of computing nodes using encryption and/or obfuscation functions which are encoded into a data map, wherein the transaction system is configured to employ a plurality of mutually different data maps concurrently.

7. The method of claim 6, wherein the method includes selective swapping data map records a type of encryption employed and how of data bits or bytes recorded in the data map to provide obfuscation.

8. A computer implemented method of (for) operating a transaction system that includes a plurality of computing nodes that are mutually interconnected via a data communication network to exchange encrypted data representative of consideration therebetween, wherein, when in operation, the transaction system employs a blockchain whose entries are recorded in a ledger, wherein a directed acyclic graph, DAG, is utilized for defining relationships between blocks of the blockchain, wherein the method includes:
  (a) implementing the ledger as a distributed ledger that stores references to a start and an end of the directed acyclic graph (DAG), as well as references to one or more smart contracts employed in operation of the transaction system, wherein the one or more smart contracts define consideration that is to be exchanged in response to provision of providing proof of completion of work; and the method further includes:
  (b) arranging for the directed acyclic graph (DAG) to comprise a plurality of proposed solutions to problems posed in the one or more smart contracts wherein each node in the directed acyclic graph (DAG) includes one solution of the plurality of proposed solutions;
  (c) arranging for each of the one or more smart contracts to include machine-readable elements including a data specification, an initial mining algorithm, an objective function for scoring the plurality of proposed solutions, wherein the objective function includes a test-set generator to generate a unique and random test set for each of the proposed solutions;
  and publishing the test set at a block time greater than the block time for publication of the proposed solutions in the directed acyclic graph by initializing a pseudo-random number generator that selects a subset of data for evaluation of the proposed solutions;
  (d) operating the transaction system to cause the directed acyclic graph (DAG) to store temporary data and/or extended algorithm code used during an execution of a given transaction, wherein the transaction system removes temporary data and/or extended algorithm code stored in the directed acyclic graph (DAG) once the execution of the given transaction is complete, and further wherein the temporary data and/or extended algorithm code stored in the directed acyclic graph (DAG) is modified in response to new solutions arising during operation of the transaction system,
  wherein the directed acyclic graph (DAG) further includes parts of the initial mining algorithm that are added after machine-readable elements of a given smart contract are defined and stored in the blockchain, such that the transaction system allows participants of the given transaction to make changes in the given smart contract during the execution of the given transaction, wherein the directed acyclic graph (DAG) grows between two consecutive blocks as the number of solutions to the problem posed in smart contract increase,
and arranging for the objective function to specify a performance level in form of a score beyond which proposed solutions are sub-optimal,
wherein the method further includes operating the transaction system to terminate computing of sub-optimal proposed solutions and to terminate a block-time for a given block based on an indication given by the end of the directed acyclic graph (DAG), when an optimized solution is achieved or when an optimized solution is not required by a transacting party associated with a computing node.

9. The method of claim 8, wherein the method includes arranging for the transaction system to employ in operation a proof-of-stake (POS) as a consensus mechanism for verifying, when the transaction system is in operation, updated entries to be made in the distributed ledger.

10. The method of claim 8, wherein the method includes arranging for the one or more smart contracts to be able, when executed within the transaction system, to change dynamically one or more addresses of parties to the one or more smart contracts.

11. The method of claim 8, wherein the method includes operating the transaction system to accommodate a given smart contract defining a problem that is to be solved, giving a plurality of parties of the transaction system an opportunity to receive consideration when the problem is solved, and wherein the consideration is a quantity representing at least one of: an access to data storage, an access to data memory, an access to data communication system bandwidth, access to data communication channels or ports, data processor energy use, data processor energy dissipation, an access time taken by data processing resources during transactions, heat generation in computing hardware, cooling energy applied to computing hardware or any other measure associated with one or more CPU cycles.

12. The method of claim 8, wherein that the method includes implementing the transaction system using one or more software applications that are downloadable to the plurality of computing nodes for interfacing with the transaction system.

13. The method of claim 8, wherein the method includes arranging for the plurality of computing nodes to provide access to one or more parties of the transaction system, wherein the one or more parties include at least one of: a transacting party, a smart contract proposer, a miner, a leader.

14. A computer program product comprising non-transitory computer-readable storage media having computer-readable instructions stored thereon, the computer-readable instructions being executable by a computerized device comprising processing hardware to execute a method of claim 8.

15. The transaction system of claim 14, wherein the system is configured to selective swap data bits or bytes recorded in the data map to provide obfuscation.

16. The method of claim 8, wherein the method further includes encrypting and/or obfuscating data communications occurring among the plurality of computing nodes using encryption and/or obfuscation functions which are encoded into a data map, wherein a plurality of mutually different data maps is employed concurrently.

* * * * *